(12) United States Patent
McDonough et al.

(10) Patent No.: US 10,125,842 B2
(45) Date of Patent: Nov. 13, 2018

(54) USE OF INDUCTIVE SENSING TO CONTROL DECOUPLER POSITION AND SWITCHABLE MOUNT PERFORMANCE

(71) Applicant: COOPER-STANDARD AUTOMOTIVE INC., Novi, MI (US)

(72) Inventors: William B. McDonough, Ortonville, MI (US); Jay Lucas, Bryanstown (CA); Wayne Jordan, Ilderton (CA); Joe Mihalic, Baden (CA)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 15/036,970

(22) PCT Filed: Nov. 17, 2014

(86) PCT No.: PCT/US2014/065981
§ 371 (c)(1),
(2) Date: May 16, 2016

(87) PCT Pub. No.: WO2015/073982
PCT Pub. Date: May 21, 2015

(65) Prior Publication Data
US 2016/0273609 A1   Sep. 22, 2016

Related U.S. Application Data

(60) Provisional application No. 61/904,998, filed on Nov. 15, 2013.

(51) Int. Cl.
F16F 13/26 (2006.01)
B60K 5/12 (2006.01)
(Continued)

(52) U.S. Cl.
CPC ............ *F16F 13/26* (2013.01); *B60K 5/1283* (2013.01); *F16F 13/10* (2013.01); *G01B 7/003* (2013.01);
(Continued)

(58) Field of Classification Search
CPC ........ F16F 13/26; F16F 13/264; F16F 13/105; F16F 13/106; F16F 13/103; B60K 5/1283;
(Continued)

(56) References Cited

U.S. PATENT DOCUMENTS 4,573,656 A   3/1986   Yoshida et al.
4,624,435 A   11/1986  Freudenberg
(Continued)

OTHER PUBLICATIONS

PCT/US2014/065981, International Search Report and Written Opinion, dated Feb. 19, 2015.
(Continued)

*Primary Examiner* — Thomas J Williams
(74) *Attorney, Agent, or Firm* — Fay Sharpe LLP

(57) ABSTRACT

A mount assembly for vibration isolation or an engine includes a housing having first and second fluid chambers that are selectively connected through an elongated, first path, and a shorter, second path. A decoupler is received in the housing, and an inductive sensor assembly senses a position of the decoupler. An associated method of inductively sensing a decoupler position to improve switchable mount performance is provided. Metallic particles or a metal inserts are provided in the decoupler to cooperate with an induction coil mounted adjacent the decoupler.

17 Claims, 5 Drawing Sheets

(51) Int. Cl.
  *F16F 13/10* (2006.01)
  *G01B 7/00* (2006.01)
  *G01D 5/12* (2006.01)
(52) U.S. Cl.
  CPC .......... *G01D 5/12* (2013.01); *F16F 2228/066* (2013.01); *F16F 2230/08* (2013.01)
(58) Field of Classification Search
  CPC ................ B60G 15/062; B60G 15/063; B60G 2202/312; B60G 2204/12422
  See application file for complete search history.

(56) References Cited

U.S. PATENT DOCUMENTS

| | | | |
|---|---|---|---|
| 4,778,158 A | 10/1988 | Hoying et al. | |
| 4,789,142 A * | 12/1988 | Hoying | F16F 13/264 267/140.15 |
| 4,806,859 A * | 2/1989 | Hetrick | G01B 7/003 310/321 |
| 4,828,234 A * | 5/1989 | Hoying | F16F 13/20 248/550 |
| 4,901,986 A | 2/1990 | Smith | |
| 4,999,534 A | 3/1991 | Andrianos | |
| 5,116,029 A * | 5/1992 | Gennesseaux | F16F 13/264 267/140.14 |
| 5,407,169 A * | 4/1995 | Tournier | F16F 13/26 248/562 |
| 5,427,347 A * | 6/1995 | Swanson | F16F 13/264 248/562 |
| 2004/0150145 A1* | 8/2004 | Tewani | F16F 13/264 267/140.14 |
| 2004/0188904 A1 | 9/2004 | Ichikawa et al. | |
| 2010/0102492 A1* | 4/2010 | Lee | F16F 13/26 267/121 |
| 2011/0024960 A1 | 2/2011 | Bradshaw et al. | |

OTHER PUBLICATIONS

EP 14 862 829.0, Supplementary European Search Report, dated Jul. 6, 2017.

* cited by examiner

Effect of Air on Phase Due to Trapped Under a Fixed Decoupler Relative to Decoupler Position

USE OF INDUCTIVE SENSING TO CONTROL DECOUPLER POSITION AND SWITCHABLE MOUNT PERFORMANCE

BACKGROUND

This application claims the priority benefit of U.S. provisional application Ser. No. 61/904,998, filed Nov. 15, 2013.

Mount performance is significantly affected by the amount of air trapped under a decoupler. Determining the position of the decoupler and the relative timing of the state switching of the mount increases the performance characteristics of the mount as well as the repeatability/consistency of this performance. More particularly, one of the key performance metrics of an engine mount is phase or frequency offset. The amount of phase is affected by the amount of air trapped under the decoupler, i.e., the rubber barrier between fluid and air chambers in the mount. Air under the coupler in a first state (State 1) is allowed to vent to atmosphere. In a second state (State 2), air is trapped under the decoupler because an evacuation port is closed or blocked.

In prior applications, air under the decoupler is evacuated via a vacuum system. However, in some applications, vacuum is no longer present. Air is trapped beneath the coupler when the evacuation port is closed or plugged via an electrical actuator.

It is been determined that an ideal scenario for peak phase is a condition with the decoupler bottomed out (i.e., biased toward maximum travel in a downward direction against a lower cage of an inertia track). Detection of the decoupler position is therefore desirable for optimizing mount performance.

Many technologies are available for "position sensing" but the functional requirements, short distance, sealed chamber, and/or hostile environment, for example, of a switchable mount design make these technologies undesirable or difficult to use for this application in a vehicle. It is also important to keep in mind that a decoupler moves quickly, i.e., typically at a low amplitude and high frequency. Again, position sensing technology must be capable of detecting such movement.

For example, ultrasonic sensing uses high frequency sounds waves, and can work with a solid panel in front of the sound transducer. Although ultrasonic sensing technology may be acceptable where the target is stationary or slow-moving, the decoupler environment is fast-moving and results in a poor signal/indication of the sensed position of the decoupler.

Infrared (IR) sensing needs an optically clear window between the chambers, and generally cannot detect extremely short distances. As a result, infrared sensing is not generally conducive to sensing decoupler position in this environment.

Capacitance sensing does not work well sensing through a plastic wall and/or fluid environment when the target is rubber. The volume of fluid in the mount environment is not sufficient to make capacitance sensing a viable option.

Radio frequency sensing (RF) requires too close a distance to be useful in certain environments.

One of the key performance metrics of a vibration isolation mount or engine mount is phase (frequency offset). In this specific application, the amount of phase is affected by the amount of air trapped under the decoupler (rubber barrier between fluid and air chambers). Air under the decoupler in a first state or state 1 is allowed to vent to atmosphere. In a second state or state 2, the evacuation port is blocked, trapping air under the decoupler.

In prior applications, air under the decoupler would be evacuated via a vacuum system. In this specific application, vacuum is no longer present, and air is trapped by plugging the evacuation port via an electrical actuator.

Accordingly, a need exists to address, for example, the air trapped under the decoupler in an engine mount, and the need to provide an accurate, dependable or reliable sensing arrangement that confirms the state of the decoupler.

DETAILED DESCRIPTION

Figure 1:
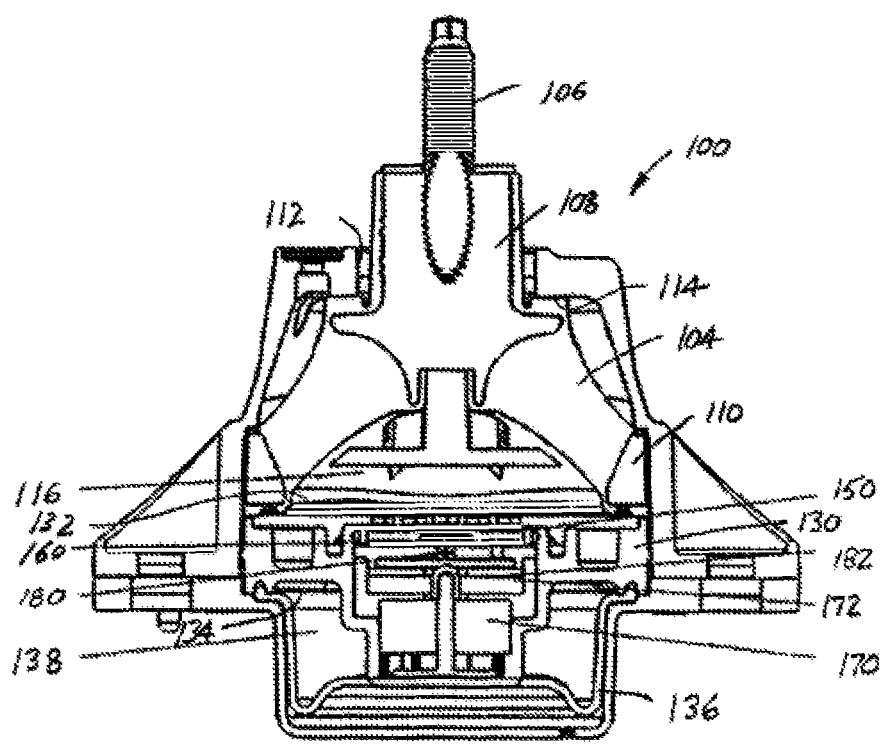
FIG. 1 is cross-sectional view (and an enlarged cross-sectional view thereof) of an engine mount or vibration isolation mount that uses an inductive sensing assembly of the decoupler in order to provide opening or closing of a vent used in the engine mount according to the present disclosure.

The Figures show a novel structure and method of detecting the position of a switchable hydro mount decoupler. This arrangement advantageously uses a signal from the decoupler and inductive sensor to determine when the decoupler is down against the lower decoupler cage (i.e., thus no air underneath is underneath the decoupler to be able to compress) and then use that information or signal to activate a solenoid (actuator) to plug the port thereby maximizing the mount stiffness, phase and damping.

Without this ability, the stiffness, damping, and phase can vary depending on what position the decoupler is in when the solenoid actuator closes off as in prior arrangements. If the decoupler is up, then air that is trapped underneath the decoupler when the solenoid closes reduces the mount performance.

Inductive sensing in a switchable vibration isolation mount or engine mount is utilized to determine the position of a rubber decoupler. When the decoupler is detected as being in an optimal position, via inductive sensing, the mount will be switched to an active state (blocking of an air transfer passage) thereby changing the mount performance to isolate/damp certain vibrational behaviors, and improving overall ride comfort.

Mount performance is significantly affected by the amount of air trapped under the decoupler. Determining the position of the decoupler and the relative timing of the state switching of the mount increases the performance characteristics of the mount as well as the repeatability/consistency of this performance.

The inductive sensor is capable of detecting various metals and the capability of the inductive sensor to detect metals through rubber (which are common in the vibration isolation assembly/engine mount environment). Previous testing has demonstrated that a best scenario for peak phase is the condition with the decoupler bottomed out (biased toward the maximum travel in the downward direction, against the inertia track lower cage).

Detection of the decoupler position is therefore a requirement for optimizing mount performance. Use of an inductive sensor assembly with a slightly metallic decoupler (via metallic insert such as metallic sheets that are flexible, an overmolded assembly where the metal in the center of the decoupler is exposed, and/or infusion of metallic particles in the rubber compound of the decoupler) provides positional consistency of the decoupler when switching the state of the mount. Without position detection, the location of the decoupler at the time of state switching cannot be predicted or guaranteed and performance characteristics of the engine mount are potentially reduced because of the air trapping issue described above.

With inductive sensing, as a metallic object (in this case a rubber decoupler with metallic characteristics) approaches an inductive coil sensor, a measure of inductance is generated and converted to a digital reading (e.g., a higher value indicates close proximity to a metallic object). Application of this technology in the mount would provide the positional accuracy and repeatability to guarantee the desired mount performance.

In an exemplary embodiment, it is preferred that an inductive sensing coil be integrated in a lower plastic housing (inertia track assembly cage) of an engine mount, along with integration of a metallic compound or metal insert into a rubber decoupler. Preferably the inductive sensor is internal to a vibration isolation mount. As a result, optimization of the performance of the vibration isolation mount during state switching through the accuracy and repeatability of component positioning can be achieved.

FIG. 1 shows a mount assembly 100 that includes a restrictor or external housing 102 dimensioned to receive a first or elastomeric component, sometimes referred to as the main rubber element or compliant member 104. The main rubber element 104 has a general shape of a truncated cone and is made of an elastomeric material such as elastic rubber. A fastener 106 extends outwardly from a metal bearing member 108 that is at least partially encapsulated within the first elastomeric member 104. As best shown in FIG. 1, a lower portion of the rubber element 104 includes a stiffener such as metallic stiffener 110 that is typically molded within the rubber element to add rigidity and support at desired locations.

The rubber element 104 is received within the restrictor housing 102 so that the fastener 106 extends through a central opening 112 of the restrictor. An internal shoulder 114 of the restrictor 102 abuttingly engages the lower portion of the main rubber element 104. Further, a lower portion of the main rubber element 104 is hollowed out to define a surface of a first or upper fluid chamber 116. A dividing wall or inertia track assembly 130 seals along an outer perimeter region with a lower surface of the main rubber element 104. In this manner, the first fluid chamber 116 is defined by the cavity formed between the main rubber element 104 and the inertia track 130. The inertia track has a first or upper surface 132 that faces the first chamber and a second or lower surface 134 that cooperates with a movable wall or diaphragm 136 preferably formed from a flexible rubber material that is sealed along an outer periphery with the inertia track assembly 130. In this manner, the inertia track assembly 130, namely the lower surface 134 thereof, and the diaphragm 136 define a second or lower fluid chamber 138.

The structure and operation of this portion of the mount is well known to those skilled in the art so that further description is unnecessary to a full and complete understanding of the present disclosure. The basic technology for switchable hydraulic engine mounts has been known in the industry for several years. As is well known in the art, a switch mechanism allows the mount 100 to switch between two states, typically one with fluid effect damping, and the other with no, or reduced, fluid effect damping. Physical switching of the hydraulic mount 100 from a fluid damped state to a non-damped state by way of opening and closing a port is well understood so that further description of the conventional portions of the mount and their operation are omitted for purposes of brevity.

Figure 2:
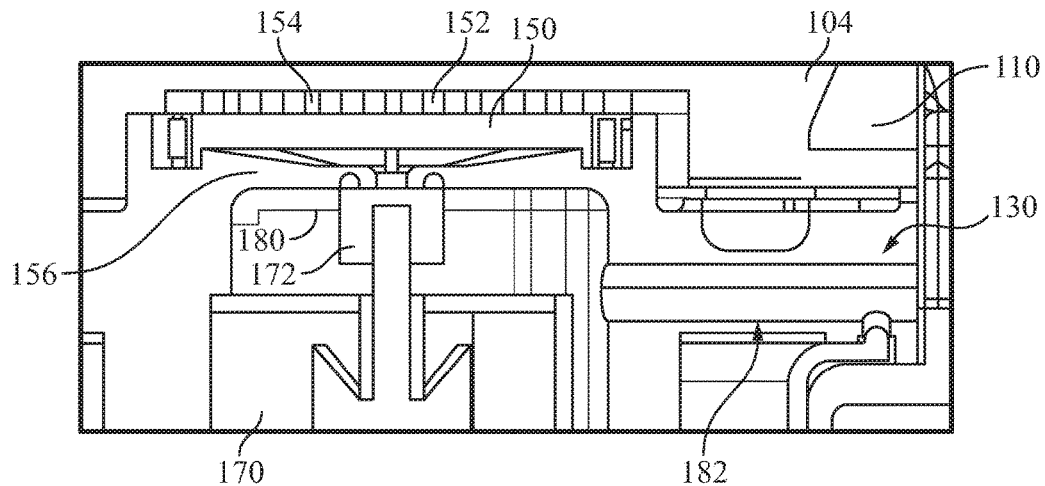
FIG. 2 is an enlarged view of a portion of FIG. 1.

A decoupler 150 is received in what is commonly referred to as a cage 152 of the inertia track assembly. More specifically, the decoupler 150 is received between a first or upper portion 154 of the cage 152 and a second or lower portion 156 of the cage (which is oftentimes a plastic structure). The decoupler 150 is typically a rubber structure but for purposes of the present disclosure incorporates at least one of a metallic insert such as a flexible metallic sheet or an infusion of metallic particles in the rubber compound that forms (at least in part) the decoupler. An air chamber 160 is provided beneath the decoupler 150. An electronic actuator 170 has a sealing tip or plunger 172 that selectively engages/seals a primary air vent 180 that communicates with vent passage 182 to atmosphere beneath the decoupler 150 (FIG. 2).

Figure 3:
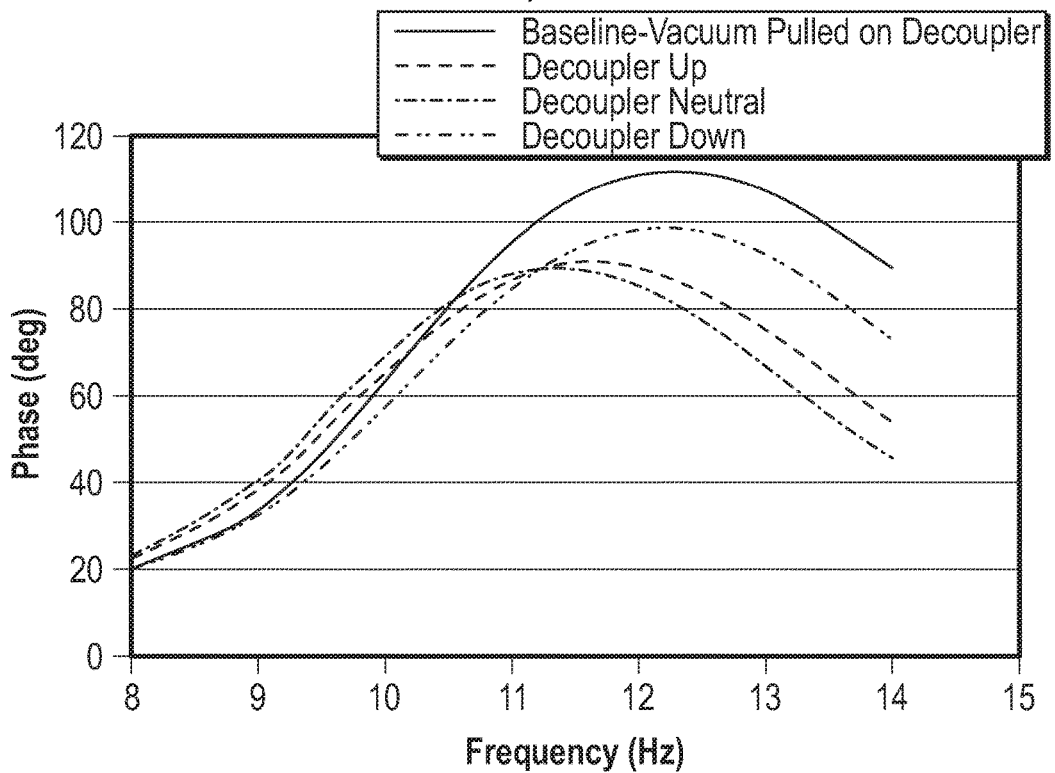
FIG. 3 is a graphical representation of the frequency and phase due to trapped air under a fixed decoupler relative to decoupler position.
Figure 4:
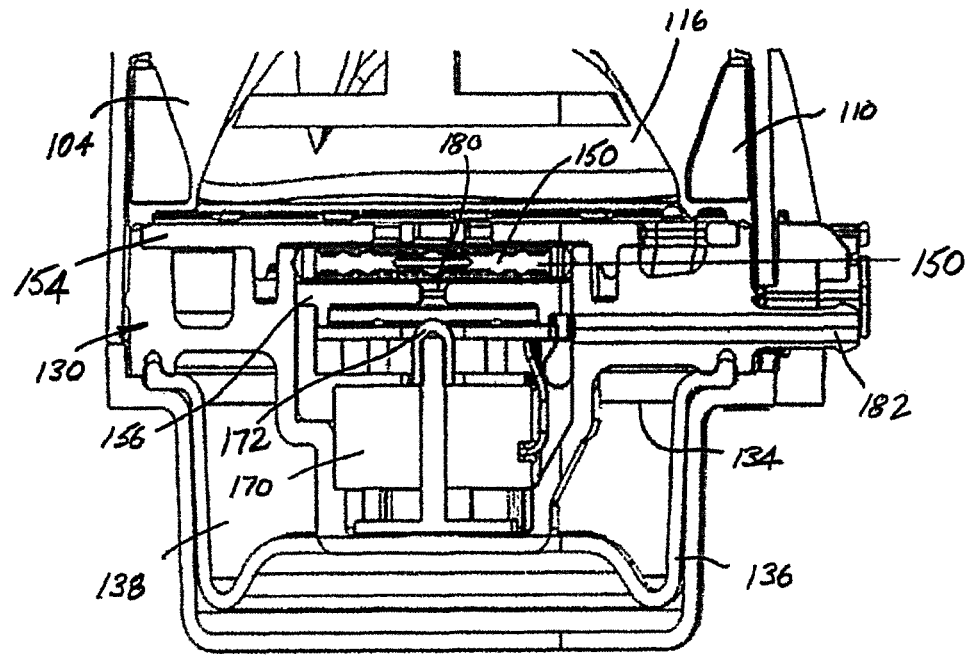
FIGS. 4-6 show different positions of the decoupler.
Figure 5:
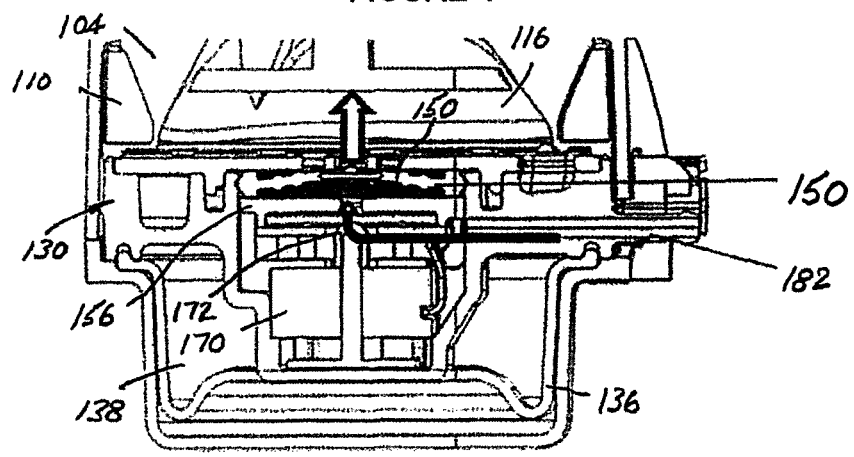
Figure 6:
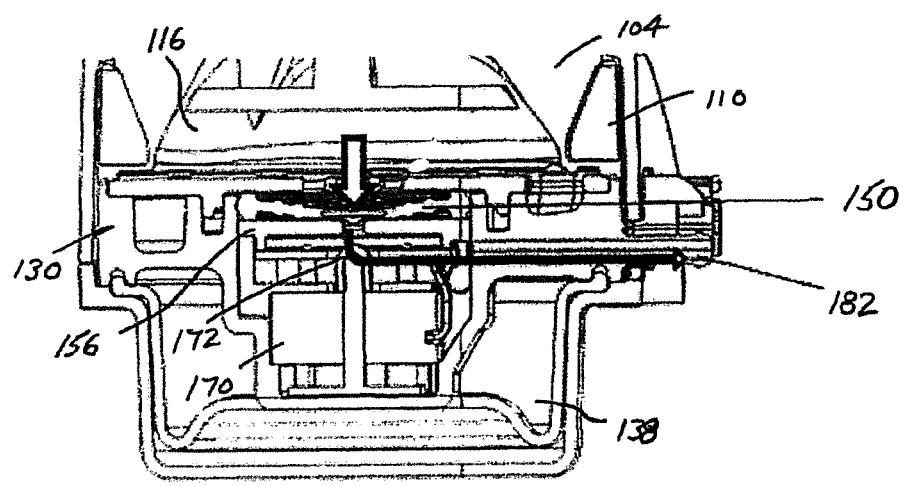

FIG. 3 illustrates the effect of air on the phase due to the air being trapped beneath a fixed decoupler relative to the position of the decoupler 150. For example, four graphical representations are shown in FIG. 3, namely, the decoupler 150 in the neutral position (graphical representation #3 of FIG. 3 and as illustrated in FIG. 4), the up position (graphical representation #2 of FIG. 3 and as illustrated in FIG. 5), and the downward decoupler position (graphical representation #4 of FIG. 3 and as illustrated in FIG. 6) relative to a baseline graphical representation of a vacuum pulled on the decoupler. In the decoupler up position of FIG. 5, air is pulled in from the exterior environment through vent passage 182 as the decoupler 150 moves upwardly. In the decoupler down representation of FIG. 6, air is forced from the chamber beneath the decoupler 150 and exits through the side vent passage 182.

Figure 7:
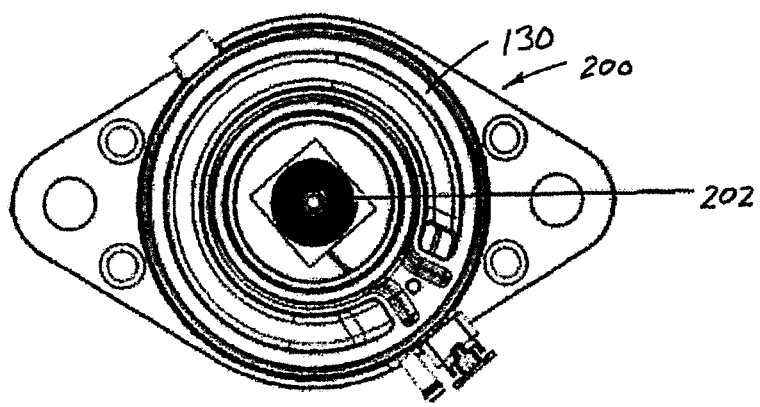
FIG. 7 is a plan view of a portion of the inductive sensor assembly.
Figure 8:
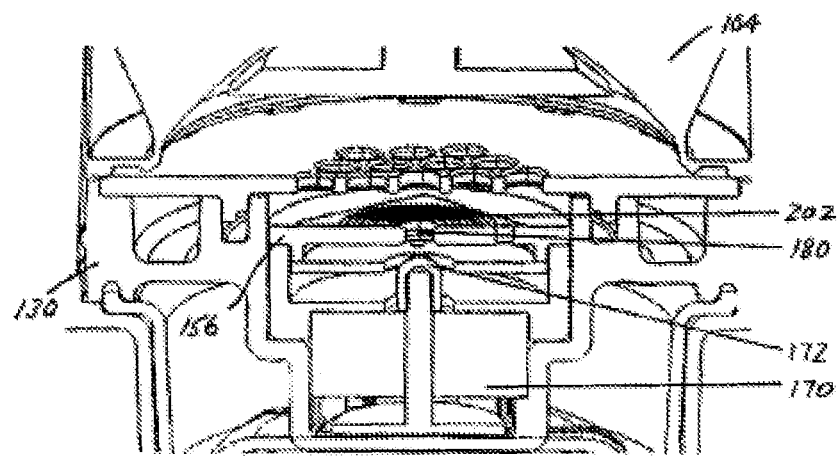
FIGS. 8 and 9 are enlarged views of the inductive sensor assembly.
Figure 9:
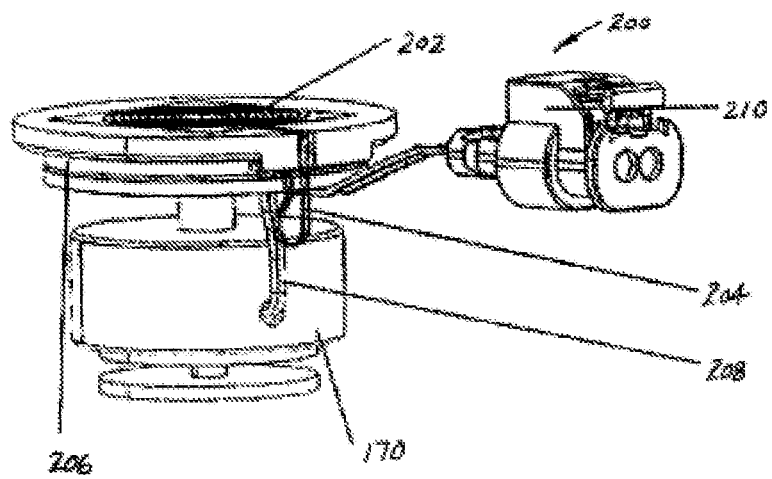

With continued reference to FIGS. 1-6, and additional reference to FIGS. 7-9, an inductive sensor assembly 200 will be shown and described in greater detail. Specifically, and as noted previously, the decoupler 150 includes at least one of metallic particles infusing the rubber compound to form the decoupler, or a metallic insert such as flexible metallic metallic sheets to define a slightly metallic decoupler. An inductive coil 202 senses a metallic object, i.e., the rubber decoupler with metallic characteristics, as the decoupler approaches. A measure of inductance is generated by the coil 202 and fed via inductive sensor/microcontroller interconnect 204 to microcontroller 206 and converted to a digital reading. The microcontroller 206 also communicates with the actuator 170 via actuator/microcontroller interconnect 208 and external power is supplied via an external connector 210 (FIG. 9). In this manner, inductive sensing is used to detect the decoupler as the decoupler approaches the inductive coil sensor. A measure of inductance is generated and the technology is advantageously located in the mount to provide positional accuracy and repeatability that improve desired mount performance. Positional consistency of the decoupler when switching the state of the mount in response to the decoupler position can be accurately predicted or achieved with this arrangement. Overall performance characteristics of the mount are increased because of the ability to determine the position of the decoupler and the relative timing of the state switching of the mount, as well as the repeatability/consistency of this performance.

This written description uses examples to describe the disclosure, including the best mode, and also to enable any person skilled in the art to make and use the disclosure. The patentable scope of the disclosure is defined by the description, and may include other examples that occur to those skilled in the art. Such other examples are intended to be within the scope of the disclosure if they have structural elements that do not differ from the literal description of the disclosure, or if they include equivalent structural elements with insubstantial differences from the literal description of the disclosure. It is also noted that each feature of each specific embodiment disclosed herein is not considered essential to that specific embodiment, and that features disclosed in one embodiment can be added or substituted with another embodiment.

What is claimed is:

1. A mount assembly for vibration isolation or engine comprising;
   a housing having first and second fluid chambers that are selectively connected;
   a decoupler received in the housing;
   an air vent beneath the decoupler;
   an actuator that selectively opens and closes the air vent;
   a switch mechanism that is operatively connected to the actuator so that (i) in a first state of the actuator, the air vent is open and air vents to atmosphere, and (ii) in a second state of the actuator, the air vent is closed and air is trapped under the decoupler;
   an inductive sensor assembly that senses a position of the decoupler and is operatively connected to the switch mechanism so that timing of the state switching of the mount is coupled to the position of the decoupler; and
   a controller that controls the actuator based on the sensed position of the decoupler.

2. The mount assembly of claim 1 wherein the decoupler is formed at least in part of a metal, and in part of a flexible rubber.

3. The mount assembly of claim 1 wherein the inductive sensor assembly includes a coil mounted adjacent the decoupler.

4. The mount assembly of claim 3 wherein the coil is mounted in an inertia track assembly adjacent the decoupler.

5. The mount assembly of claim 1 wherein the inductive sensor assembly includes a coil that senses a position of the decoupler, and communicates with the controller and the actuator responsive to the controller that selectively opens and closes a vent passage that communicates with the decoupler.

6. The mount assembly of claim 5 wherein the inductive sensor assembly receives power from an associated external source via a connector that communicates with the controller.

7. The mount assembly of claim 5 wherein the decoupler is formed at least in part of a metal, and in part of a flexible rubber.

8. The mount assembly of claim 7 wherein the decoupler includes a metal insert therein.

9. The mount assembly of claim 1 wherein the inductive sensor assembly includes a coil mounted on a cage surface of an inertia track assembly adjacent the decoupler.

10. The mount assembly of claim 9 wherein the coil is located on the cage surface in surrounding relation to an air vent that communicates beneath the decoupler.

11. A mount assembly for vibration isolation or engine comprising:
    a housing having first and second fluid chambers that are selectively connected;
    a decoupler received in the housing, wherein the decoupler is formed at least in part of a metal, and in part of a flexible rubber and includes metallic particles included in the rubber; and
    an inductive sensor assembly includes a coil that senses a position of the decoupler, and communicates with a controller and an actuator that selectively opens and closes a vent passage that communicates with the decoupler.

12. A method of detecting a position of a decoupler in a mount assembly comprising:
    providing a decoupler received in the mount assembly; and
    inductively sensing a position of the decoupler relative to an air vent beneath the decoupler; and
    controlling an actuator with a controller that selectively opens and closes the air vent beneath the decoupler based on the sensed position of the decoupler.

13. The method of claim 12 wherein the sensing step includes positioning a coil adjacent the decoupler.

14. The method of claim 12 wherein the providing step includes forming the decoupler at least partly of metal.

15. The method of claim 14 wherein the metal forming step includes incorporating a metallic insert in the decoupler.

16. The method of claim 12 further comprising using the inductively sensed position of the decoupler to control the air vent beneath the decoupler.

17. A method of detecting a position of a decoupler in a mount assembly comprising:
    providing a decoupler received in the mount assembly;
    forming the decoupler at least partly of metal including incorporating metal particles in a rubber of the decoupler; and
    inductively sensing a position of the decoupler relative to an air vent beneath the decoupler.

* * * * *